S. W. Curtis,
Flower-Pot Cleaner,
N° 48,912. Patented July 25, 1865.
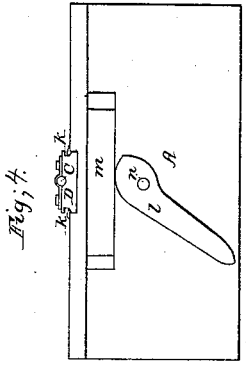
Fig. 4.
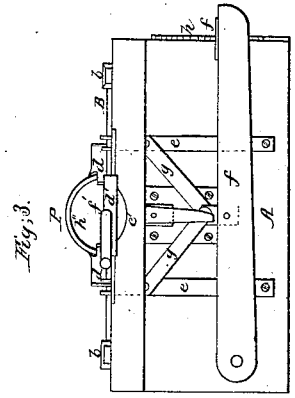
Fig. 3.
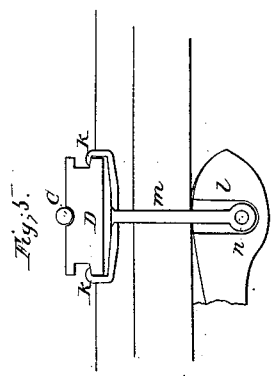
Fig. 5.
Fig. 6.
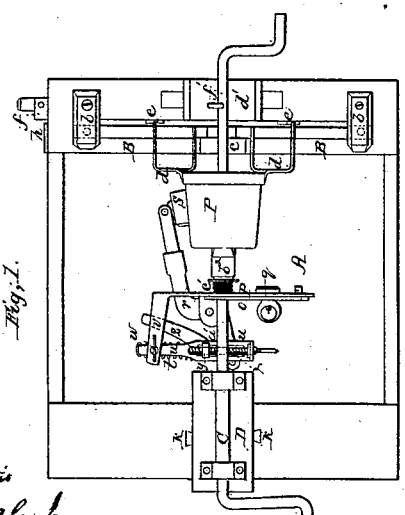
Fig. 1.
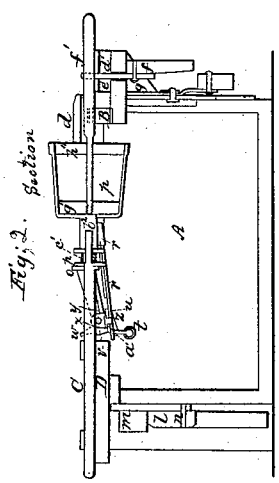
Fig. 2. Section
Witnesses;
Fredrick Curtis
H. P. Haleigh
Inventor;
Samuel W Curtis
by his attorney
R. H. Eddy

UNITED STATES PATENT OFFICE.

SAMUEL W. CURTIS, OF STOUGHTON, MASSACHUSETTS.

MACHINE FOR CLEANING FLOWER-POTS.

Specification forming part of Letters Patent No. 48,912, dated July 25, 1865.

*To all whom it may concern:*

Be it known that I, SAMUEL W. CURTIS, of Stoughton, in the county of Norfolk and State of Massachusetts, have invented a new and useful Machine for Cleaning Flower-Pots or articles of like character; and I do hereby declare the same to be fully described in the following specification and represented in the accompanying drawings, of which—

Figure 1 is a top view of it; Fig. 2, a longitudinal section of it; Fig. 3, a front-end view; Fig. 4, a rear-end elevation; Fig. 5, a section of its spindle-carriage and the clamping mechanism thereof. Fig. 6 is a longitudinal section of the slide-bar (and its supports) of the mechanism for holding the pot.

In the said drawings, A denotes a tub or tank for receiving water or a washing-liquid. On one side of the tub there is arranged a slide-bar, B, held in place on two pins, $a$ $a$, projecting up from the tub by two turn-buttons, $b$ $b$, such slide-bar being curved or bent down at its middle in manner as shown at $c$ in Fig. 6. On the said bar two holders or jaws, $d$ $d$, slide, each of which projects into the forked upper end of one of two upright levers, $e$ $e$, arranged on the outer side of the tub, as exhibited in Fig. 5. A lever, $f$, connected with the two jaw-levers $e$ $e$ by two toggles, $g$ $g$, serves to move such toggles in a manner to enable the levers to be moved either apart from or toward one another, in order to close the jaws upon a flower-pot when placed between them. A rack, $h$, fixed to the side of the tub, serves, by means of a projection, $f$, from the lever, to keep the said lever down when the jaws are hold of the flower-pot.

A spindle or shaft, C, is applied to a movable carrier or carriage, D, and arranged with respect to the jaws as shown in Fig. 1. The carriage D is so applied to the tub as to be capable of being moved in a direction toward the jaws, and, besides, the said carriage has a mechanism by which it may be clamped in position, such mechanism consisting of two clamps, $k$ $k$, and a cammed lever, $l$, this being formed and arranged as shown in Figs. 4 and 5. The cammed lever works against a projection, $m$, extending from the tub. By turning the lever on its fulcrum $n$ the jaws will be drawn downward on the carriage D, and will hold it firmly in place.

An arm, $o$, projects from the spindle at a right angle to it. Alongside of this arm is a slotted slider, $p$, which slides on the spindle and against the arm, and has a clamp-screw and nut, as shown at $q$, by which it may be fixed in position. The said slider supports the fulcrum of a bent lever, $r$, which is arranged on the slider in manner as exhibited in Figs. 1 and 2. A brush or scrubber, $s$, is hinged to the longer arm of the said lever. A spiral spring, $t$, has one end attached to the shorter arm of the lever, its other end being affixed to a slider, $u$, which slides through an arm, $v$, projecting from the first-mentioned slider, $p$. A set-screw, $w$, screwed into the arm, serves to clamp the slider $u$ to it. Furthermore, an adjusting-screw, $x$, goes through the slider $u$ and screws into a stud, $y$, which projects down from a cammed lever, $z$, which is arranged on the slider and works against the shorter arm of the brush-lever $r$. The stud from the cammed lever passes through a slot, $a'$, formed in the slider $u$. The screw $x$ enables the pressure of the spring on the lever of the brush to be increased or diminished at pleasure. By means of the spring $t$ the brush will be borne up against the flower-pot when held between the jaws and by the spindle and during the revolution of the brush around the pot. By means of the cammed lever $z$ the brush may be forced and held away from the flower-pot.

A flower-pot, P, preparatory to being cleansed, is to be placed with its mouth between the jaws $d$ $d$, which should be closed upon it. After this a conical piece of wood, $b^2$, placed on the spindle and resting against a spring, $c'$, arranged thereon, should be inserted in the small drip-hole made centrally through the bottom of the flower-pot. Next, the brush or scrubber should be allowed to bear against the external surface of the flower-pot, and the spindle should be revolved so as to carry the brush entirely around the said surface as many times as may be necessary to effect the cleaning of it. The brush, in case the tub may be full of water, will during each revolution be dipped into the water, and consequently will apply such to the surface of the pot, so as to wash it.

When the brush is not so long as the outside surface of the flower-pot we may dispense with the conical piece of wood $b^2$ and let the spindle enter the hole of the flower-pot. Under these circumstances we may change the brush to a new position on the flower-pot by moving the spindle-carrier forward or backward, as may be necessary.

A spindle-bearing block, $d'$, may be so applied to the tub, and in the position as shown in the drawings, as to be capable of being removed therefrom, in order that a flower-pot holding a plant may be cleansed, in which case the plant would extend through the bend $c$ of the slide-bar B, and also through a cavity, $e'$, made in the top of the tub, as shown in Fig. 3. This bearing-block $d'$ is intended to support a spindle, $f'$, Fig. 7, having one fixed conical head, $g'$, and a movable one, $h''$, to enter a flower-pot and hold it to the spindle. Such a spindle with such heads may be used to hold a pot instead of the jaws. I mention this as a modification which I have contemplated as a means of holding an empty flower-pot while it may be in the process of being cleaned by the brush. In this case the flower-pot may be revolved against the brush, if preferable to having the brush revolved against the pot.

The mechanism above described may be readily adjusted to a flower-pot of almost any ordinary size, and answers an excellent purpose for cleaning it. The holding apparatus may also be so constructed as to hold the flower-pot by its smaller end, in order to enable the brush to be placed within it and revolved therein so as to cleanse the inner surface of the pot.

I claim—

1. The mechanism for grasping and holding the pot, the same consisting of the movable jaws $d\ d$, their slide-bar B, the levers $e\ e$, the toggles $g\ g$, the lever $f$, and the rack $h$, as specified.

2. The combination of the water tank or tub A with the apparatus for holding the pot and with that for cleaning it, as described.

3. The combination of the slider $p$ and its clamp $q$ with the slider $u$, the brush-lever $r$ and its pressure-springs $t$, and the cammed lever $z$, the whole being arranged and so as to operate together substantially as specified.

4. The combination of the longitudinal adjusting-carriage D and its clamping devices $k\ l\ m$ with the spindle C.

5. The combination of the conical holder $b'$ and the spring $c'$ with the spindle C and the holding-jaws $d\ d$ and the brush $s$, and the mechanism for revolving the brush, as specified.

SAMUEL W. CURTIS.

Witnesses:
R. H. EDDY,
F. P. HALE, Jr.